April 18, 1933.                    H. LIVA                    1,904,794
                   PERMANENT AND TEMPORARY BRAKE LOCK
                    Filed Oct. 28, 1931        5 Sheets-Sheet 1

WITNESSES

INVENTOR
Henry Liva
BY
ATTORNEY

April 18, 1933.    H. LIVA    1,904,794
PERMANENT AND TEMPORARY BRAKE LOCK
Filed Oct. 28, 1931    5 Sheets-Sheet 3

WITNESSES
Edw. Thorpe
A. L. Kitchin

INVENTOR
Henry Liva
BY Munn & Co.
ATTORNEY

Patented Apr. 18, 1933

1,904,794

UNITED STATES PATENT OFFICE

HENRY LIVA, OF SCRANTON, PENNSYLVANIA, ASSIGNOR OF ONE-HALF TO ANGELO SEBASTIANELLI, OF SCRANTON, PENNSYLVANIA

PERMANENT AND TEMPORARY BRAKE LOCK

Application filed October 28, 1931. Serial No. 571,629.

This invention relates to brake locks and particularly to an improved brake lock which may act to permanently lock the brake in functioning position or temporarily lock the brake in functioning position, the object being to provide a construction which may be manually set at any time and will automatically function for one complete cycle thereafter, affording freer movement and added safety in the control of the automobile than those attained with the usual means so far in use.

Another object of the invention is to provide a mechanism operatively connected with the brake mechanism of an automobile whereby the brake when usually applied may be held either temporarily or permanently applied without the use of the operator's foot.

An additional object is to provide a permanent or temporary lock for brakes of automobiles whereby the brake may be held permanently in an applied position or temporarily held, the structure being such that the temporary locking of the brake may be timed to occupy as many seconds as desired.

A further object, more specifically, is an attachment for automobiles having a hand actuated member arranged adjacent the steering wheel of the automobile or on the dash board and the remaining mechanism connected with the brake pedal of the automobile, the structure being such that normally the brake structure functions in the usual manner without operating the attachment, but when the hand operated member is moved, the attachment functions to either temporarily or permanently lock the brake in braking position according to the way the hand operated member has been positioned.

In the accompanying drawings—

Figure 10:
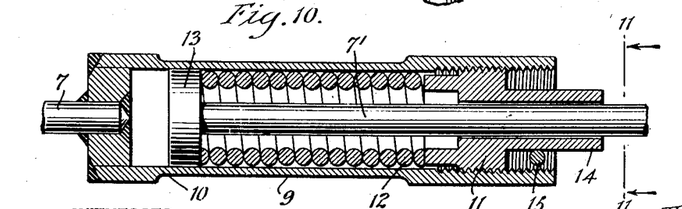
Figure 10 is an enlarged fragmentary sectional view through Figure 1 on line 10—10.
Figure 11:
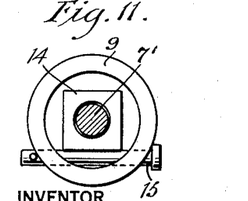
Figure 11 is a sectional view through Figure 10 on line 11—11.

Referring to the accompanying drawings by numerals, the principal mechanism is arranged in a box 1 from which the rods 2 and 3 extend. Rod 2 is pivotally connected at 4 to an extension 5 forming part of the foot brake lever 6. The usual brake pull rod 7 is connected to the extension 8 when functioning in the usual manner. However, a cushion member 9 is interposed in the length of rod 7 to give a certain spring or cushion effect, and other reasons which will be hereinafter fully disclosed. This cushion member is shown in detail in Figures 10 and 11 from which it will be seen that this member is provided with a tubular casing 10 carrying an adjustable stop 11 against which the spring 12 rests. A piston 13 is connected to the section 7' of rod 7 and extends to the extension 8 so that whenever the brake is applied, spring 12 is first pressed and when fully compressed as shown in Figure 10, acts as a solid member so that the desired pull on the rod 7 may be secured for applying the brake shoe of the automobile. It is to be understood that the automobile may be provided with any kind of a brake shoe and springs for releasing the same when the rod 7 is released, and with any kind of brake, that is to say, with mechanical or hydraulic brakes. In order to adjust the tension of the spring 12, the adjustable stop 11 is provided with an extension 14, square on the outside so as to coact with the pin 15. By this means, the stop 11 may be adjusted and locked in any adjusted position. It will be seen that the brake pull rod 7 will undergo a predetermined elongation when the brake is applied and a corresponding predetermined contraction when the brake is released. The adjustment of the extension of this contraction is a means to put under suitable compression the pneumatic apparatus (hereinafter fully described) a predetermined time before the beginning of the release of the brake shoes. The more the contraction, the more time lapses before the brake shoes begin to be released. So, the adjustment of the contraction of the pull rod 7 is a timing means for the release of the brake to which the operator may resort to at any time it may be desired. A spring 16 (Figure 1) is connected with extension 5 and acts to normally hold the same in the position shown in Figure 1 which is the position when the brake shoe is released. Normally the brake is held by lever 6 which is actuated in the usual manner and the rods 2 and 3 and associated parts are idle.

Rod 3 is connected through a bell-crank lever 17 to a rod 18, and in turn rod 18 is connected through bell-crank lever 19 to rod 20, which rod is connected through screw member 21 (Figure 13) to the slide rod 22 which is slidingly mounted in the sleeve 23, which sleeve is clamped by suitable abutment 24 and nut 25 to a bracket 26 clamped in any suitable manner to the steering post 27 or to the dashboard. The sleeve 23 is provided with a longitudinally positioned slot 28 and a cam 29 at one end, said cam coacting with the extension 30 for holding the hand operated member or grip 31 in the dotted position shown at 31' in Figure 13 when moved to that position. When in the dotted position as just described, the parts are moved so that the brake mechanism including the brake band of the automobile is locked against releasing. When moved to the dotted position indicated by 32 in Figure 13, the brake mechanism of the automobile is temporarily locked against releasing as hereinafter fully disclosed. It will thus be seen that when an automobile is on an incline as indicated by the line 33 in Figure 1 and the car is stopped because of a traffic light or some other reason, the operator naturally applies the brake by pushing down on the pedal 6. Normally he holds this brake down until the signal changes and then, must remove his foot from the pedal in order to operate the accelerator of the automobile. When he does this, normally the automobile starts to drift backwardly. The present invention is intended to prevent this accident.

Figure 1:
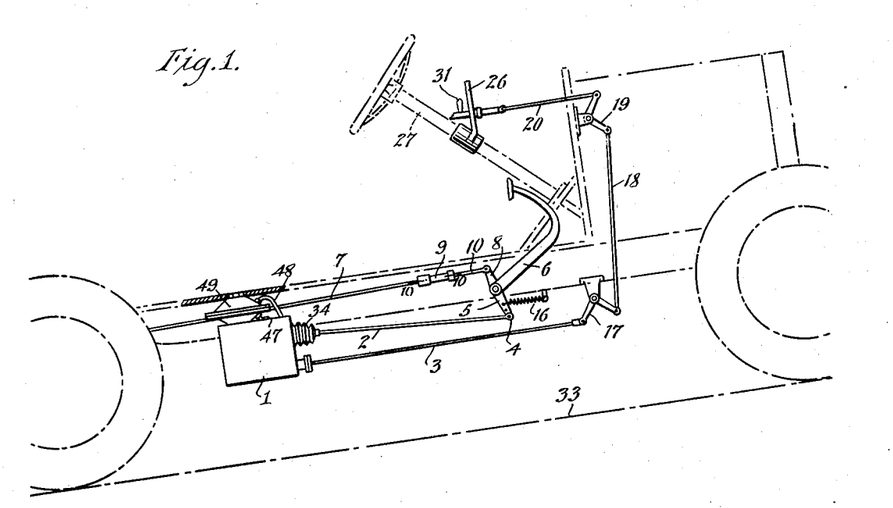
Figure 1 is a side view in diagram of an automobile with an attachment embodying the invention shown applied thereto, the automobile being shown on an incline.
Figures 13, 14, 15, 16, 17, 18, 19:
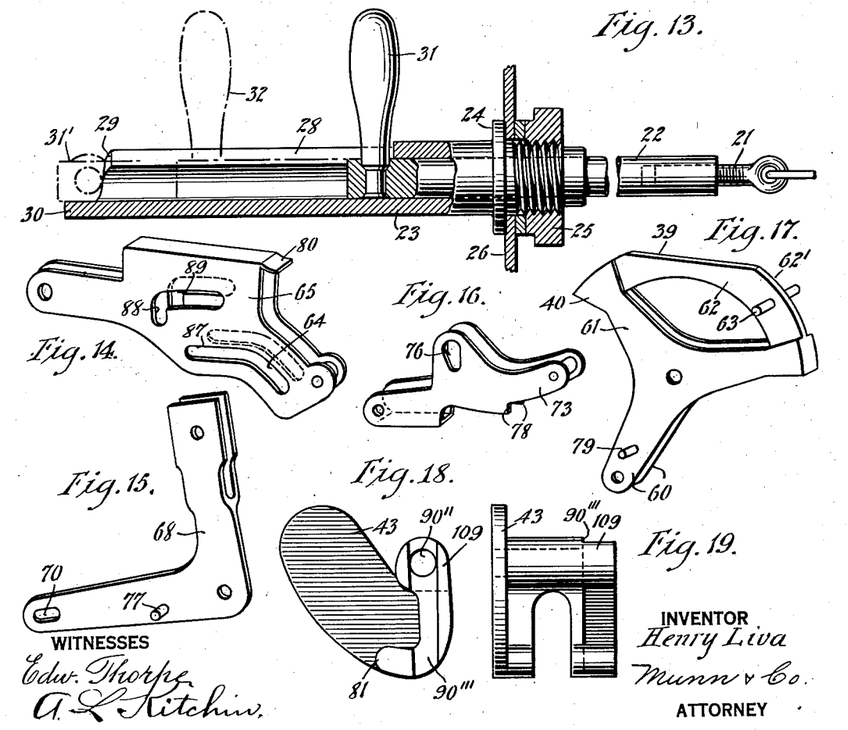
Figure 13 is an enlarged view partly in section and partly in elevation of the hand operated mechanism shown in Figure 1.
Figure 14 is a perspective view of the permanent locking lever shown in Figure 2.
Figure 15 is a perspective view of the bellcrank lever shown in Figure 2.
Figure 16 is a perspective view of the holding lever shown in Figure 2.
Figure 17 is a perspective view of the locking member shown in Figure 2.
Figure 18 is a bottom plan view of the valve actuated cam shown in Figure 2.
Figure 19 is an edge view of the cam shown in Figure 18.

When the automobile as shown in Figure 1 is provided with the present invention and the operator is about to remove his foot from the pedal 6 to apply the accelerator, he first moves the hand operated member or grip 31 over to the position indicated by 32 in Figure 13 which will temporarily lock the brake mechanism against releasing. As soon as he does this, he moves his foot from the pedal 6 and applies it to the accelerator so that the car may start as soon as he desires. The mechanism as in part already described and as hereinafter fully described is such that the temporary locking of the brake mechanism may be varied and is usually from three to five seconds. This gives the operator ample time to shift his feet and start the engine in a desired manner, without permitting the car to drift. In putting this invention to a severe test, on steep acclivities and declivities on a heavy automobile having the brakes in bad condition it has been possible to keep the car stopped for about five seconds after having released the brake pedal and while having all driving means neutral.

Figure 3:
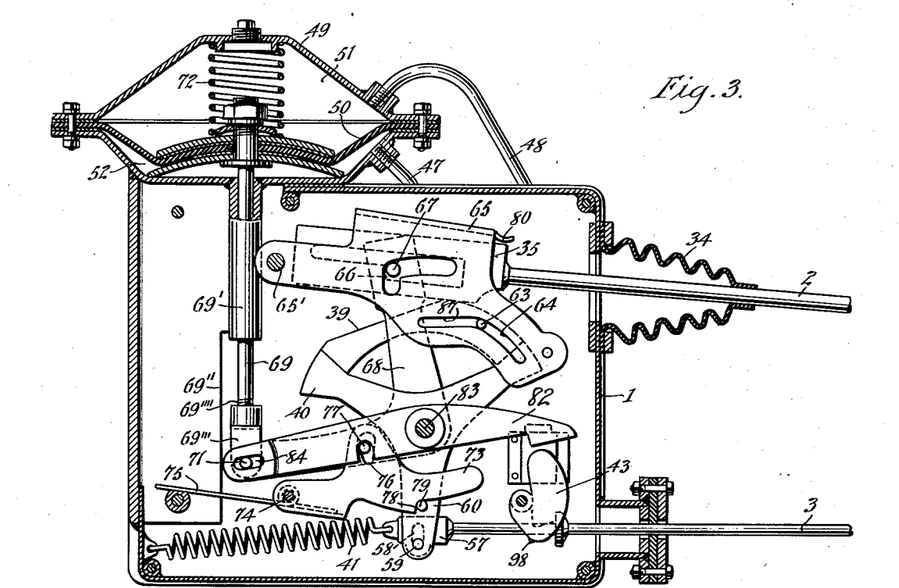
Figure 3 is a view similar to Figure 2 but showing the parts in a position temporarily locking the brake of the automobile.
Figure 4:
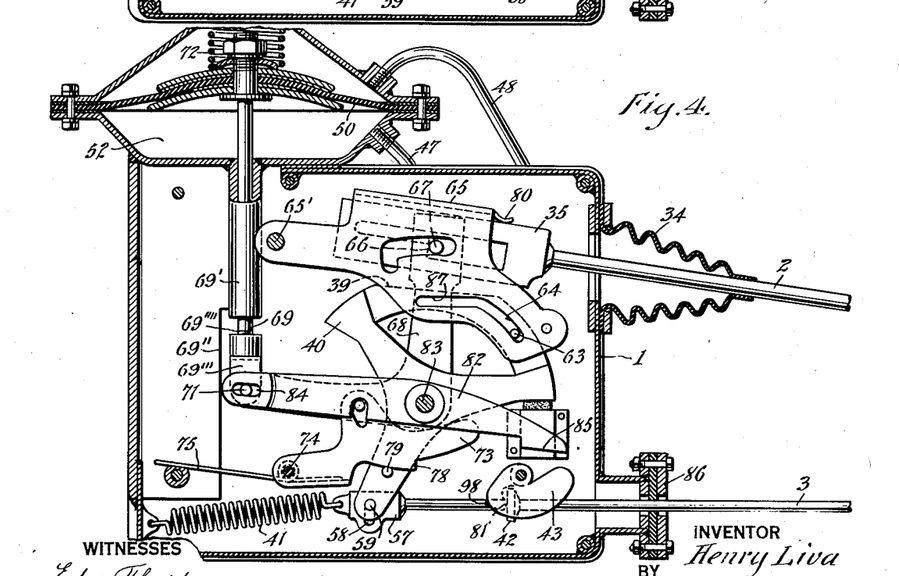
Figure 4 is a view similar to Figure 3 but showing the locking mechanism partially released.
Figures 5, 6:
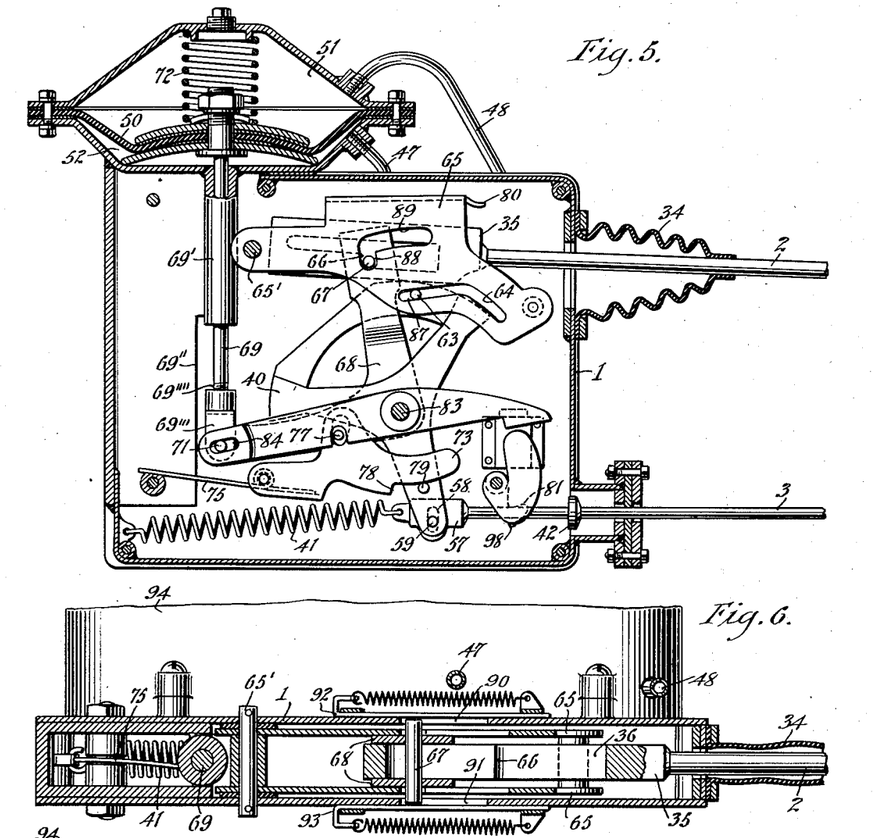
Figure 5 is a view similar to Figure 3, but showing the locking mechanism positioned to permanently lock the brake against releasing.
Figure 6 is a sectional view through Figure 2 on line 6—6.
Figure 7:
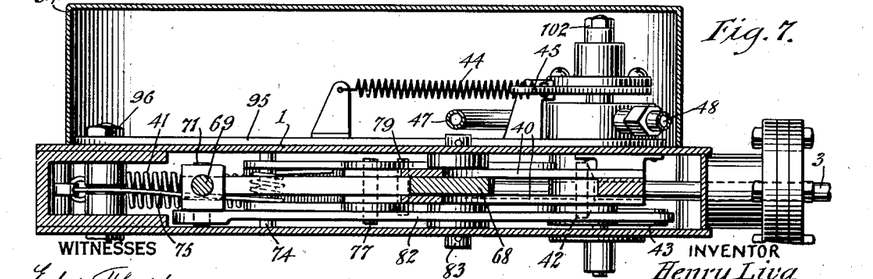
Figure 7 is a sectional view through Figure 2 on line 7—7.

As shown in Figures 2, 3, 4, 7 and 8, the mechanism is illustrated in different positions to which the parts move as they are shifted to temporary locking position and as they are released. The mechanism as shown in Figure 5 illustrates how the parts are located when the brake mechanism is permanently locked as for instance when the car is to be parked for some time. It will be understood that the usual emergency brake may be used if desired. Also, it is to be understood that unless the member 31 is actuated, the brake mechanism functions in the usual manner.

Figure 2:
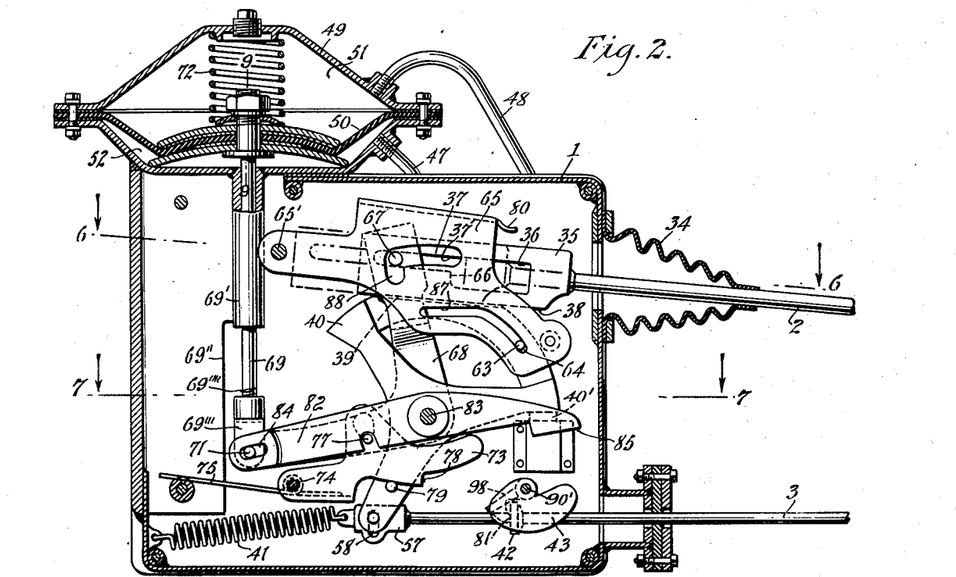
Figure 2 is an enlarged vertical sectional view through the locking mechanism shown in Figure 1.

In Figure 2, it will be seen that the rod 2 extends through a flexible member 34 which is intended to prevent dust from entering the housing or casing 1. A flat bar or plate 35 is welded or otherwise rigidly secured to rod 2 and is preferably rectangular in shape with a rectangular opening 36 merging into an elongated substantially rectangular slot 37. The surface 38 is flat and is adapted to slide with a little clearance with respect to the flat surface 39 of the rocking member 40. The surface 37' is flat and smooth and is adapted to slide freely on the top surface of pin 67 with which it is constantly at a tangential contact when the locking mechanism is idle. When the parts are in the position shown in Figure 2, the rod 2 and member 35 may slide back and forth freely as the brake pedal 6 is moved back and forth. This back and forth sliding movement will not affect any other parts in the casing 1 until the rod 3 has been shifted by the movement of member 31 as heretofore mentioned. When the automobile stops on an incline as shown in Figure 1 and it is again desired to start the automobile, the driver moves the member 31 to the position 32 shown in Figure 13, and then operates the accelerator and other parts of the driving mechanism in a well known manner. After having applied the brake, as soon as the operator pulls the hand operated member 31 to the position 32 as shown in Figure 13, rod 3 would be moved from the position shown in Figure 2 which is what may be termed an idle position to the position shown in Figure 3. This movement is, of course, against the action of spring 41. As this movement takes place, the abutment 42 of rod 3 moves out of the way of the cam 43 and consequently the spring 44 (Figure 8) moves the lever 45 and closes the valve 46. This is connected through pipes 47 and 48 to the casing 49 but on opposite sides of the diaphragm 50 as shown in Figure 3. This diaphragm may be of any suitable kind and made of any suitable material.

Figure 9:
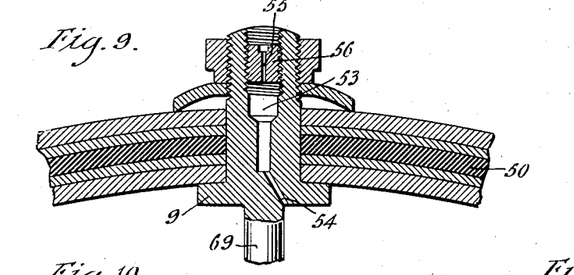
Figure 9 is an enlarged fragmentary sectional view through Figure 2 on line 9—9.

As soon as the valve 46 is closed as just described, the chamber 51 will then be a closed chamber separate from the chamber 52 except through the leakage pass illustrated in Figure 9. This leakage pass consists of a suitable port or passageway 53 and 55 having an outlet passage 54 which is appreciably larger than the vent passageway 55 of the plug 56. Plug 56 is adapted to be removed at any time and a new one substituted having a different sized passageway 55. By varying the passageway 55, the speed of venting of the chamber 51 is varied and consequently the time which the mechanism holds the brake mechanism is varied or adjusted. For instance, if the parts are so proportioned that the passageway 55 will allow four seconds before the brake mechanism is released, it is evident that a greater time limit could be provided by substituting a plug having a smaller passageway than that illustrated in Figure 9. This is another means of timing the release of the brake.

Referring again to Figure 3, it will be noted that the rod 3 carries an enlargement 57 having a slot 58 accommodating the pin 59 which extends through the respective arms 60 of the rocking member 40. From Figure 17, it will be seen that there are two arms 60 merging into a Y-shaped structure 61 to which an arc-shaped bar 62 is welded or otherwise rigidly secured. Bar 62 is provided with a straight section 39 to clear plate 35 when the locking mechanism is idle. This bar is also provided with a pin 63 extending on opposite sides of the bar 62 to fit into the respective slots 64 of the permanent locking lever 65.

Figure 8:
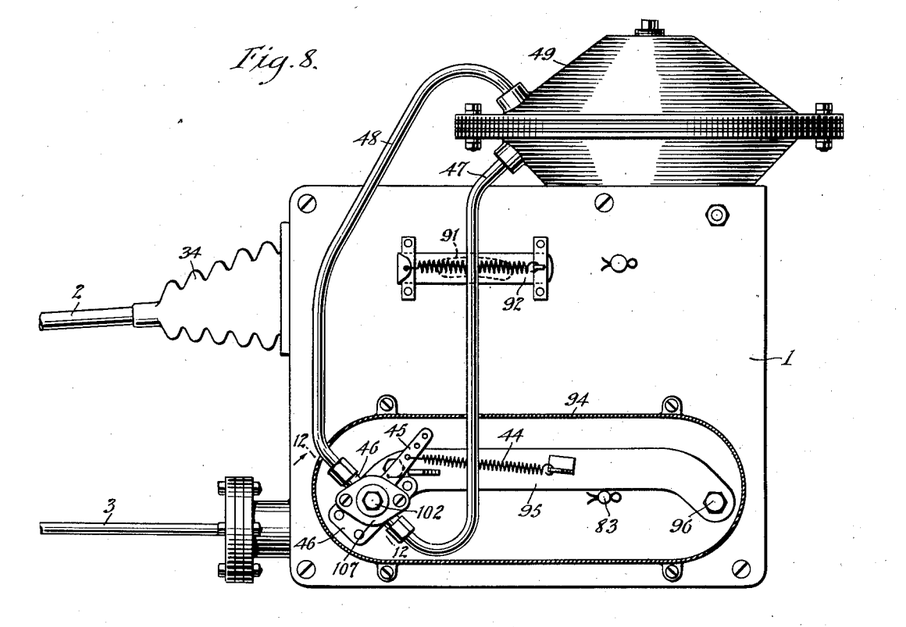
Figure 8 is a side view of the structure shown in Figure 2, the same being on the opposite side to the part removed in Figure 2.

When, after having applied the brake, the rod 3 is shifted as above set forth, it is moved from the position shown in Figure 2 to the position shown in Figure 3 and consequently moves arms 60 and bar 62 to the position shown in Figure 3 which causes the rounded section 62' to strike the surface 38 of plate 35 and raise said plate until the shoulder or abutment 66 rests against pin 67 carried by the bell-crank lever 68. The upper end of this bell-crank lever is bifurcated as shown in Figure 15 and straddles the plate 35 so that the pin 67 extends through the two bifurcations of lever 68, through plate 35 and through opening 88 of lever 65, said pin naturally operating in the respective slots 36 and 37. When the parts are in this position, the spring 16 and the other parts which move the brake mechanism to a released position cannot instantly function but will slowly function and consequently will slowly pull the rod 2 back to substantially the position shown in Figure 1. The slow action or pulling movement is caused by the speed at which the air may pass through the passageway 55 as shown in Figure 9. As shown in Figure 3, as the plate 35 and associated parts acting through the shoulder 66 moves the pin 67 and swings bell-crank lever 68, motion will be transmitted through lever 68 to the rod 69. Lever 68 is provided with a slot 70 which accommodates the pin 71 rigidly secured to rod 69 by fork 69''' and thread 69'''' so that as the lever 68 is swung, rod 69 is moved upwardly as shown in Figure 4 and against the action of the spring 72. As soon as the parts move to almost the position shown in Figure 4 the lift lever 73 is raised. This lever is pivotally mounted at 74 and is acted upon by spring 75 for giving this lever a tendency to swing downwardly. This lever is provided with a slot 76 through which the pin 77 extends, said pin being carried by the bell-crank lever 68. It will thus be seen that as the bell-crank lever moves and swings upwardly, pin 77 will move to the upper end of the slot 76 and will then swing the lever 73 upwardly against the action of spring 75. This upward movement continues until the shoulder 78 moves away from the pin 79. As soon as this occurs, the spring 41 quickly moves rod 3, rocking member 40. pin 79 and associated parts to the position shown in Figure 4. This brings the flat section 39 of member 40 directly beneath the plate 35 whereupon said plate may move downwardly by gravity. A resilient extension 80 is formed on the lever 65 for giving an initial push so that the plate 35 may quickly drop downwardly and function as shown in Figure 2, namely, slide back and forth as the brake mechanism works. As the rod 3 moves quickly to the left as shown in Figure 4, the abutment 42 strikes the stop 81 of valve 46 and swings the cam back to its open position against the action of spring 44 (Figure 8). As soon as this takes place, the chambers 51 and 52 are connected through the pipes 47 and 48 and consequently there will be no appreciable resistance on either side of the diaphragm 50. This will permit the spring 72 to force rapidly the diaphragm 50, rod 69, lever 68 and other parts back to the position shown in Figure 2, ready for a second operation, within about two seconds, the complete cycle of operation requiring about seven seconds.

It will be seen that a starting lever 82 is pivotally mounted on the shaft or rod 83 which carries the bell-crank lever and rockable member 40. This lever is provided with a slot 84 for accommodating the pin 71 and with a pushing or contact surface 85. When the parts begin to move from the position shown in Figure 3 to that shown in Figure 4, the surface 85 contacts with part of the cam 43 and gradually pushes the same to an open position against the action of spring 44, but the full opening of the valve does not take place until the abutment 42 actuated by rod 3 functions. By allowing greater or less space for cam pushing surface 85, the action of the parts may be hastened or retarded. It will be noted from the drawings that rod 3 extends through a suitable packing box 86 so that the various parts of the box or casing 1 may be thoroughly oiled or may even operate in grease.

In case the operator desires to park the car for some time, he will apply the brake pedal 6 in the usual manner and when this is fully done, he pulls the hand operated member 31 to the extreme left hand position shown in Figure 13 and then rotates the handle 31 until it is in the position 31'. After the handle 31 is shifted over to 90° or more until it strikes the projection 30, it cannot move back and consequently the spring 16 and associated parts cannot shift the rod 2. When the grip 31 is moved to the position 31' as shown in Figure 13, the various mechanisms found in the casing 1 are shifted to the position shown in Figure 5. It will be seen from this figure that the abutment 42 is moved entirely away from cam 43 and that the rockable member 40 has been swung for raising the plate 35. This swinging movement carried the parts over to such an extent that the pin 63 has moved into the section 87 of the slot 64 and consequently pin 63 has swung the permanent locking lever 65, pivotally mounted at 65', upward until the offset slot or notch 88 for accommodating the pin 67 while the slot 89 is idle. When in this position, the pin is resting against the shoulder or abutment 66 and consequently the rod 2 cannot move to the right as shown in Figures 1 and 5. Any attempt at movement in this direction would cause the pin 67 to press against the wall of the slot 88. In this manner the brake mechanism is locked.

When it is again desired to start the car, the hand member 31 is moved from the position 31' in Figure 13 to the position 32 and then the parts will immediately function as heretofore disclosed in respect to Figures 2, 3 and 4.

It will be noted from the drawings that the various parts of the casing and certain other parts are welded together so as to provide not only a strong construction, but one that is grease tight.

Figure 12:
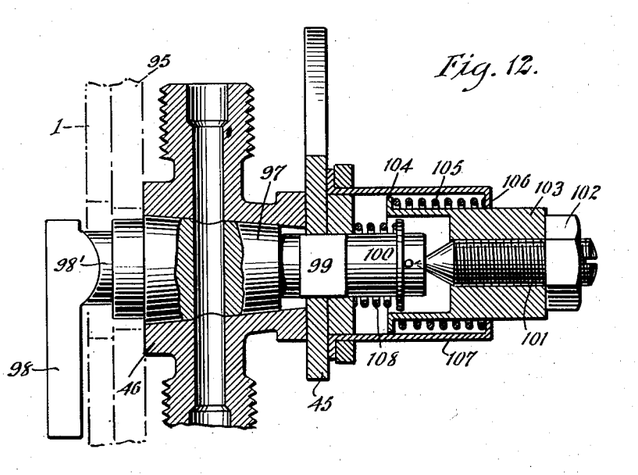
Figure 12 is an enlarged fragmentary sectional view through Figure 8 on line 12—12.

From Figures 6 and 8, it will be seen that the housing or casing 1 is provided with slots or openings 90 and 91, said slots being closed by spring actuated slides 92 and 93. The pin 67 may be applied or removed from either of these slots whenever desired. From Figure 8, it will be seen that a housing 94 is arranged below the slide 92, said housing enclosing a plate 95 which is secured to the casing 1 by suitable screws 96 and having fastened on it the valve 46. The valve 46 is shown more in detail in Figures 8 and 12 and is used to connect pipes 47 and 48. As indicated in Figure 12, the valve 46 is provided with a key 97 having a substantially rectangular arm 98 rigidly secured thereto. The end of the key 97 opposite arm 98 is provided with a square portion 99 merging into a round extension 100, against which the pointed end of the adjustable screw 101 rests. Screw 101 is locked in place by nut 102 which nut rests on the sleeve 103, said sleeve being formed with a flange 104 against which the spring 105 rests. Spring 105 also rests against the end 106 of casing 107 which casing is secured in any desired manner to the arm 45. In this way the spring 105 acts to give the key 97 a tendency to move in a direction to make the same loose in the casing of the valve while the spring 108 acts to hold the key fitted by properly adjusting the screw 101. These springs may be balanced to a desired extent, so that while the key 97 will freely rotate or rock, it will present an air tight contact. The casing of valve 46 is rigidly secured in any desired manner to plate 95 and said plate is secured in the casing 1 by screws 96.

It will be noted that the stem 90' extends through one of the walls of the casing 1 and through hole 90" of cam 43 up to the surface 90''' of the same cam, so that the arm 98 is in position for accommodating the slotted extension 109, and cam 43. This arrangement permits the cam to rotate the key 97 of valve 46, when the cam is rotated either by the action of the abutment 42 or the pusher member 85. It will be noted that the spring 44 normally holds the valve closed and that the abutment 42 normally holds the valve open, said abutment acting against the projection portion 81 of member 109.

In operation, when the device is in working condition and the hand operated member is in full line position as shown in Figure 13, the brake pedal 6 may be used in the usual manner as well as the other parts of the automobile. When the brake pedal 6 has been applied, and it has been desired to lock the same temporarily to prevent a back drift when starting from a stop on an up-hill grade, hand operated member 31 will be moved to the dotted position indicated by 32 in Figure 13. This will lock the rod 2 to certain parts in the housing 1 so that as the spring 16 and the other springs used for releasing the brake band of the brake mechanism to function, rod 2 will be pulled upwardly and cause the rod 69 to force the diaphragm 50 into chamber 51. This movement is accomplished slowly because of the small orifice 55 in plug 56 shown in Figure 9. It will be noted that rod 69 is guided by a tube 69' which is welded or otherwise rigidly secured in place and also welded or otherwise secured to the reinforcing member 69". Any suitable means of attachment to the automobile's structure may be fastened together with the reinforcing member 69". After the parts have been moved forwardly by spring 16 and associated springs until the release lever 73 has been raised, the plate 35 and associated parts will slide back and forth without hindrance, and the remaining parts will again automatically quickly assume the position shown in Figure 2 ready for another actuation. It will be noted that the various mechanism in the casing or housing 1 will not function to lock the brake mechanism unless the hand operated member 31 has been shifted by hand to either the position 32 or 31' as shown in Figure 13.

When an automobile provided with the invention is running or standing still on a horizontal surface, the parts will be substantially as shown in Figures 1 and 2, the mechanism in housing 1 being idle, and the rod 3 and associated parts being stationary. The rod 2 will reciprocate idly when the brake is being used in the ordinary way now in common practice. However, in case the automobile should be stopped on an up-hill grade, the foot pedal 6 is depressed and the brakes applied so as to prevent a back drift of the automobile. When again starting the automobile, the operator's foot must be taken off of the pedal 6 to be applied to the accelerator and when this occurs, the car will begin to drift backwardly. To prevent this back drift during the shifting of the foot, the operator may grasp the grip 31 and pull the same to the dotted position marked 32 in Figure 13. This will cause the rod 3 to be pulled from the position illustrated in Figure 2 to the position illustrated in Figure 3. This occurs while the brake pedal 6 is in an operative position and when the rod 2 and plate 35 have been forced rearwardly. As the rod 3 is moved forwardly or to the right, as shown in Figure 2, it will swing the member 40 to the position shown in Figure 3, and thereby cause the curved surface 62' to engage the surface 38 of plate 35 and raise the plate 35 until the shoulder 66 is back of the pin 67. This will prevent the rod 2, lever 6, and associated parts, from moving back from the action of the spring 16 until the member 40 and associated parts have been restored to substantially the position shown in Figure 2. As the rod 3 moves to the right as shown in Figure 2, the abutment 42 will engage cam 43 and rotate the same for closing the valve 46, whereupon the chambers 51 and 52 function as closed chambers. As soon as the parts have been moved to the position shown in Figure 3, spring 16 will begin to function and will slowly pull rod 2, plate 35 and associated parts to the right as shown in Figure 3. This will cause the lever 68 to be swung by reason of the action of the pin 67 which is carried by this lever. The lever 68 is connected with the rod 69 and as the lever is swung, as just set forth, the rod 69 will be gradually raised and will force the diaphragm 50 into the chamber 51 against the action of the spring 72, the speed of movement being controlled by the strength of the spring 16 and the size of the passageway 55 shown in Figure 9. As indicated in the drawings, the parts are so proportioned that it will take about four seconds to move the diaphragm from the position shown in Figure 3 to that shown in Figure 4. The lever 68 carries a pin 77 and as the lever is caused to operate, as just described, for raising the rod 69, pin 77 will be raised and as this pin is fitted into the slot 76 of the lever 73, said lever will be raised as soon as the lever 68 has moved the pin 77 to the upper end of the slot 76. Immediately upon the pin 77 moving the lever 73 upwardly, as shown in Figure 4, it will release the pin 79 carried by the member 40 and, consequently, will permit spring 41 to quickly move member 40, rod 3 and associated parts to the position shown in Figure 4. During this movement, the abutment 42 strikes the shoulder 81 and moves the cam 43 so as to open the valve 46, whereupon air may readily pass from chamber 51 to the chamber 52 or in a reverse direction. This will permit the spring 72 to quickly move the diaphragm and associated parts back to the position shown in Figure 2. As member 40 moves back to the position shown in Figure 4, the curved part 62' will move away from the plate 35 and the flat portion 39 will move opposite plate 35 so that this plate may drop down against the flat portion 39 and thereby cause the shoulder 66 to move away from the pin 67, thus permitting the rod 2 and associated parts to freely reciprocate. When the parts have moved back to the position shown in Figure 2 they remain in this idle or non-functioning position until the grip 31 is again moved manually. Whenever desired the grip 31 could be moved over to the dotted position 31' shown in Figure 13. When this occurs, not only are the parts moved as just described but in addition, by reason of the additional movement of the grip 31, abutment 42 is moved to the right as shown in Figure 5 and member 41 is swung over to such an extent that the pin 63 carried thereby will move into the section 87 of slot 64, and thereby swing the permanent locking lever 65 upwardly so that the pin 67 will be resting in the notch 88. This will prevent the rod 2 from moving to the right as shown in Figure 5, notwithstanding the pull of spring 16. When the parts are in the position just described, the brake mechanism is locked against release and will remain in this locked position until grip 31 has been swung from the position shown at 31' in Figure 13 to the position marked 32 in Figure 13, whereupon the spring 16 and associated parts may function to release the brake mechanism. This arrangement for permanently locking the brake mechanism is desirable when parking a car either on an incline or on a horizontal surface. It will, therefore, be noted that through the action of the grip 31, the usual brake mechanism of the car may be temporarily locked against release or may be permanently locked against release.

I claim:

1. The combination of an automobile provided with a brake mechanism having a brake pedal, of a rod connected with said pedal and adapted to be moved longitudinally in one direction when the brake pedal has been moved to braking position, a mechanism associated with said rod for permitting a slow return of said rod and thereby a slow releasing of said braking mechanism, and hand operated means for setting the first mentioned means into functioning position, said hand operated means including a plurality of rods and levers extending to near the steering column of said automobile, a hand member for reciprocating said rod and means coacting with the hand member for locking the hand member in an operative position.

2. A device of the character described including a reciprocating rod, a plate having a substantially L-shaped slot connected with said rod, a housing enclosing said plate, a bell-crank lever pivotally mounted in said housing and provided with a pin extending through said slot, said pin being adapted to engage the offset portion of said L-shaped slot when said plate has been raised, manually actuated means for raising said plate and pneumatic means for resisting forward movement of said plate and rod, said pneumatic means being provided with an adjustable leakage vent controlling the speed at which said plate is allowed to move.

3. A lock for the brake mechanism of automobiles including a reciprocating rod connected to said brake mechanism and reciprocated thereby, said brake mechanism moving said rod rearwardly during the application of the brake mechanism and forwardly when the braking mechanism is released, a plate connected to said rod provided with an aperture having a shoulder, a casing enclosing said plate, a lever pivotally mounted in said casing and provided with a pin extending into said aperture, means extending to the control mechanism of the automobile for manual operation for shifting the position of said plate to cause said shoulder to interlock with said pin and prevent a return movement of said rod, a reciprocating member connected with said lever, a diaphragm connected with said rod, and means forming a chamber divided into two compartments by said diaphragm, a spring for urging said diaphragm in one direction and a leakage passageway for permitting the air to escape from one of said compartments as said diaphragm is moved against the action of said spring, said rod moving forwardly and said brake mechanism gradually moving to a released position as the air passes through said vent passageway.

4. A lock for locking the usual brake mechanism of automobiles against releasing, said lock including a reciprocating rod connected with said braking mechanism and adapted to be reciprocated thereby, a pneumatic check for retarding the movement of said rod in the direction for releasing said brake mechanism and hand actuated means for causing said pneumatic check mechanism to function, said actuated mechanism including a hand control rod hand operated in one direction, and a spring for moving the rod automatically in the opposite direction, and means operated by said rod for swinging certain parts of the pneumatic check means into functioning position.

5. A lock for locking the braking mechanism of an automobile, said lock including a reciprocating rod, a lever connected with said rod for resisting movement thereof from one direction, a movable rod connected with said lever, a diaphragm connected with said movable rod, a casing surrounding said diaphragm, said casing divided into a primary and secondary compartment, a spring for normally moving said diaphragm and movable rod to a predetermined position, said rod and diaphragm being adapted to be moved to the opposite extreme position as the first mentioned rod is pulled by the braking mechanism, said diaphragm and movable rod being provided with a vent passageway and moving according to the speed of air passing through said vent passageway.

6. A lock for the brake mechanism of an automobile, said lock including a diaphragm, a casing surrounding said diaphragm, a spring for urging said diaphragm to one side of the casing, a vent extending through the diaphragm for permitting the diaphragm to be moved against the action of the spring, a valve having its opposite ports connected to said casing on opposite sides of said diaphragm, means for opening said valve after the diaphragm has moved a predetermined distance, and means for connecting said diaphragm with the brake mechanism of the automobile for controlling the release of the brake bands thereof.

7. In a lock of the character described, a reciprocating rod, a bell-crank lever, means for connecting the bell-crank lever with the rod, pneumatic means for resisting the movement of said lever, said pneumatic means being provided with a leakage vent and a valve having the outlet ports connected to the opposite side of said vent, and means for opening said valve automatically when said lever has been moved to a predetermined position for permitting the quick release of the lever on said rod.

8. A lock for locking the brake mechanism of automobiles against releasing, said lock including a reciprocating rod connected with said braking mechanism, swingable means connected with said rod, pneumatic means for resisting the movement of said swingable means and rod, said pneumatic means having a leakage bypass for permitting a slow movement, a valve having its ports connected with the opposite side of said bypass, automatically actuated means for moving said valve to an open position when said lever has been moved to a predetermined position whereby a quick release is secured, and a pivotally mounted lock and lever for preventing the opening of said valve until said lever has moved to a predetermined position.

9. In a lock for locking the brake mechanism of an automobile, a rod provided with a plate acting as a holding arm, and means including a pin interlocking with said plate, a rockable member having a flat portion and a rounded portion, said plate normally resting on said pin and cleared by said flat portion, hand actuated means for moving said rockable member so that the rounded portion will engage and raise said plate until it interlocks with said pin and means including a check mechanism for retarding the movement of said pin, said check mechanism including means for compressing air and means presenting a vent for said air.

10. In a lock for locking the brake mechanism of an automobile against releasing, means connected with said brake mechanism provided with a plate having a shoulder, a pivotally mounted bell-crank lever provided with a pin, manually actuated means for moving the plate so that the shoulder thereof will engage said pin, and automatically actuated catch for preventing said manually actuated means from releasing the parts asociated therewith, a reciprocating rod connected with one end of said bell-crank lever, said rod being adapted to be moved in one direction by the lever as the lever is moved by a pull from said brake mechanism, a diaphragm connected with said rod, a casing coacting with said diaphragm for confining a quantity of air, said air adapted to be compressed as said lever moving said rod is shifted, said diaphragm and a removable apertured plug carried by said diaphragm and rod presenting a relief vent for the air compressed by said diaphragm.

11. In a lock for locking the brake mechanism of automobiles, a reciprocating member connected to and reciprocated by the brake mechanism of an automobile, said reciprocating member having a plate formed with a shoulder, a bell-crank lever having a pin adapted to engage said shoulder, means for retarding the movement of said pin and thereby retarding the return movement of said reciprocating member, and a manually actuated structure formed with an offset notch adapted to receive said pin for locking the pin against return movement and thereby locking said brake mechanism against release.

12. A lock for locking the brake mechanism of an automobile in its operative or braking position, said lock including a reciprocating member connected with said brake mechanism, a pin interlocking said reciprocating mechanism, a swinging permanent locking lever formed with a notch adapted to receive said pin for holding the pin and the reciprocating mechanism against movement, and a hand operated mechanism for shifting said permanent locking lever so that it will engage said pin in said notch.

13. A lock for locking the brake mechanism of automobiles so that they will not be released, including a rod connected with said brake mechanism, said rod having means formed with a shoulder, a pin positioned to engage said shoulder, a permanent locking lever formed with a notch for receiving said pin and holding the pin against movement, and manually actuated mechanism for shifting said lever so that said notch will receive said pin, said mechanism including a rockable member provided with a pin adapted to move in the arc of a circle, said permanent locking lever having a substantially L-shaped slot for receiving the last mentioned pin, a rod for moving said rocking member to cause said pin to raise said permanent locking lever and catch means for preventing a return movement of said rockable member.

14. A locking mechanism for locking the brake mechanism of an automobile, including a spring interposed in the pull rod of said braking mechanism, a reciprocating rod connected with said braking mechanism, and a plurality of mechanisms coacting with the reciprocating member for temporarily locking the reciprocating member against movement and permanently locking said reciprocating mechanism against movement.

15. A locking mechanism for locking the brake mechanism of an automobile, including a spring interposed in the pull rod of said braking mechanism, so that said pull rod may undergo an adjustable predetermined elongation when the brake is applied and a corresponding predetermined contraction when the brake is released, a reciprocating rod connected with said braking mechanism, and a plurality of mechanisms coacting with the reciprocating member for temporarily locking the reciprocating member against movement and permanently locking said reciprocating mechanism against movement.

16. A locking mechanism for locking the brake mechanism of an automobile, means coacting with said brake mechanism for preventing the return of said brake mechanism after an actuation, and means for gradually releasing said locking mechanism, said means including an air valve, said valve comprising a casing having a passageway therethrough, a key having a passageway therethrough, said key having a projecting end, a spring acting on said end for causing said key to move to its seat and means acting against said spring for maintaining said key sufficiently loose to rotate, said last mentioned means including a casing, a spring acting against one end of said casing, a tubular member positioned at one end fitting over the extension valve of said key, said tubular member having a flange coacting with last mentioned spring forcing the tubular member toward said extension, an adjustable screw carried by said tubular member and pressing against the end of said extension, and means for locking said screw in different adjusted positions.

HENRY LIVA.